United States Patent [19]
Ishikawa et al.

[11] Patent Number: 5,934,257
[45] Date of Patent: Aug. 10, 1999

[54] CONTROL DEVICE FOR INTERNAL COMBUSTION ENGINE

[75] Inventors: Takeshi Ishikawa; Naoki Tsuda, both of Tokyo, Japan

[73] Assignee: Kioritz Corporation, Tokyo, Japan

[21] Appl. No.: 08/959,047

[22] Filed: Oct. 28, 1997

[30] Foreign Application Priority Data

Oct. 30, 1996 [JP] Japan ................................. 8-288091

[51] Int. Cl.⁶ .......................... F02D 17/02; F02D 43/00; F02M 51/00
[52] U.S. Cl. ....................................... 123/481; 123/73 C
[58] Field of Search ............................... 123/73 A, 73 B, 123/73 C, 198 F, 481

[56] References Cited

U.S. PATENT DOCUMENTS

| | | | |
|---|---|---|---|
| 4,779,581 | 10/1988 | Maier | 123/73 A |
| 4,813,391 | 3/1989 | Geyer et al. | 123/73 C |
| 4,876,999 | 10/1989 | Schierling et al. | 123/252 |
| 4,991,558 | 2/1991 | Daly et al. | 123/73 C |
| 5,038,739 | 8/1991 | Ishii | 123/481 |
| 5,085,193 | 2/1992 | Morikawa | 123/73 C X |
| 5,097,811 | 3/1992 | Baumuller | 123/73 C X |
| 5,165,373 | 11/1992 | Cheng | 123/300 |
| 5,259,344 | 11/1993 | Huang et al. | 123/73 C |
| 5,438,968 | 8/1995 | Johnson et al. | 123/73 C X |
| 5,584,281 | 12/1996 | Katoh | 123/481 X |
| 5,769,041 | 6/1998 | Suzuki et al. | 123/73 C |

*Primary Examiner*—Torry M. Argenbright
*Attorney, Agent, or Firm*—Baker & Botts, L.L.P.

[57] ABSTRACT

A control device for a two-cycle internal combustion engine combustion engine of the fuel injection type, which is provided with an ignition control device and a fuel control device, wherein the fuel control device includes an injection mode-controlling means for controlling a timing of fuel injection by selecting a particular fuel injection mode, i.e. selecting the mode from a one-injection per revolution mode where the injection of fuel is performed on every revolution of a crank shaft of the internal combustion engine and a thinned-out injection mode where the injection of fuel is performed on plural revolutions of the crank shaft. The fuel control device is provided also with an injection quantity-controlling means for controlling the quantity of fuel to be injected.

8 Claims, 2 Drawing Sheets

CONTROL DEVICE FOR INTERNAL COMBUSTION ENGINE

BACKGROUND OF THE INVENTION

1. Field of the Invention

This invention relates to a control device for an internal combustion engine of the fuel injection type, and in particular to a control device for a two-cycle fuel-injection internal combustion engine that is relatively small in size and suited for use in a portable working machine such as a chain saw or a bush cutter.

2. The Prior Art

There is known a two-cycle internal combustion engine of the direct fuel injection type, as disclosed, for instance, in U.S. Pat. No. 4,813,391. According to this technique, a fuel injection nozzle is disposed at a cylinder head portion of a combustion chamber so as to permit the injection of fuel to be effected directly into the combustion chamber. In this case, a fuel pump is actuated taking advantage of the fluctuation in pressure within a crank case. Through such actuation of the fuel pump, a fuel is fed to the fuel injection nozzle and then directly injected into the combustion chamber. The stroke of fuel injection, i.e. the injection of fuel from the injection nozzle, is performed as follows. As the piston is moved downward, the pressure inside a crank-case is proportionally increased, and when the piston is brought down to approximately the bottom dead center, the fuel pump is actuated by the pressure inside the crank-case, thus feeding fuel to the fuel injection nozzle, from which the fuel is injected by the pressing force of the fuel pump into the combustion chamber.

There is also known another example of a two-cycle internal combustion engine of the direct fuel injection type, wherein a fuel injection nozzle is disposed midway of an air passage (scavenging passage) communicating with a combustion chamber. Fuel from the injection nozzle is injected toward a heat conductive wall constituting a cylinder wall and impinged thereon so as to be gasified and mixed with air passing through the air passage, the resultant air-fuel mixture being fed to a combustion chamber (U.S. Pat. No. 4,876,999).

With increasing concern in recent years of environmental problems, a reduction not only of the toxic substances in the exhaust gas but also engine noise is strongly demanded, even in a small two-cycle internal combustion engine. In particular, there are problems inherent to a two-cycle internal combustion engine, i.e. a problem of how to reduce the quantity of HC in the exhaust gas which is brought about due to a phenomenon of blow-by of unburnt air-fuel mixture from the combustion chamber, and a problem of how to prevent the discharge of unburnt air-fuel mixture which is brought about due to a phenomenon of spitting of fuel toward the air-cleaner. These problems are also desired to be solved.

On the other hand, a lean burn engine or a direct injection engine wherein fuel is directly injected into a combustion chamber has been recently proposed as a four-cycle internal combustion engine. According to these types of engine, the reduction of toxic substances in the exhaust gas by means of a lean-burning technique is taken into consideration. Therefore, it is now studied how to apply this technique to a two-cycle internal combustion engine.

In the case of the aforementioned engine of the direct fuel injection type (U.S. Pat. No. 4,813,391), since a fuel injection nozzle is mounted on a cylinder body and fuel is directly injected from the fuel injection nozzle into the combustion chamber, the discharge of HC in the exhaust gas due to the phenomenon of blow-by of unburnt air-fuel mixture from the combustion chamber, or the discharge of unburnt fuel due to the phenomenon of spitting of fuel toward the air-cleaner can be minimized. However, since the structure of the engine itself is formed as a two-cycle engine, the reduction in discharge of unburnt air-fuel mixture is not yet sufficient enough, thus leaving room for further improvement.

Furthermore, since the fuel is injected by the delivery pressure of a fuel pump from a fuel injection nozzle at the delivery motion thereof, the timing of fuel injection as well as the quantity of fuel to be fed are rather difficult to adjust, thus making this fuel injection mechanism unsuitable for controlling the air/fuel ratio, as in a lean-burn technique for instance.

Moreover, this prior technique is irrelevant to an improvement of certain phenomena peculiar to the two-cycle internal combustion engine, such as the rattling of the piston during idling or a loud combustion noise.

BRIEF SUMMARY OF THE INVENTION

The present invention has been made under the circumstances mentioned above. It is therefore an object of the present invention to provide a control device for a two-cycle internal combustion engine that is not only capable of easily controlling the fuel injection timing and the quantity of the fuel to be injected, but also capable of minimizing toxic components in the exhaust gas and lowering the engine noise.

According to the present invention, there is provided a control device for a two-cycle internal combustion engine of the fuel injection type, which is provided with an ignition control device and a fuel control device, wherein the fuel control device is provided not only with an injection mode-controlling means for controlling the timing of injection of fuel so as to switch a fuel injection mode, e.g. from a one-injection per revolution mode where the injection of fuel is performed on every revolution of a crank shaft of the internal combustion engine to a thinned-out injection mode where the injection of fuel is performed on every plural revolutions of the crank shaft, and vice versa, but also with an injection quantity-controlling means for controlling the quantity of fuel to be injected.

According to a preferred embodiment of the present invention, there is provided a two-cycle internal combustion engine of the fuel injection type, wherein the switching of the said injection mode-controlling means is performed based on a signal from a detecting means which is designed to detect a rotated angle of a throttle lever or a suction controlling valve; and the injection quantity-controlling means is designed to control the quantity of fuel to be injected according to a signal to be emitted corresponding to a load on the engine, such as the revolution speed of the internal combustion engine, and also designed to selectively control the heating of heating elements disposed in a plural number of fuel injection nozzles.

Since the control device of a two-cycle internal combustion engine of the fuel injection type, constructed as mentioned above according to this invention, is provided with the injection mode-controlling means, the injection timing (injection mode) can be variously controlled, i.e. the injection mode may be suitably selected from one fuel injection per every revolution of the crank shaft, a thinned-out injection to perform one fuel injection per every second revolution of the crank shaft, a thinned-out injection to perform one fuel injection per every third revolution of the crank shaft, and so on.

This injection mode-controlling means is also designed to select an injection mode according to an output signal from a detecting means for detecting, for instance, the revolution speed corresponding to a load on the internal combustion engine.

Since the control device of the internal combustion engine of this invention is provided with the injection quantity-controlling means, each heating element mounted on each of plural injection nozzles can be independently and selectively heated so as to adjust the quantity of fuel to be injected from the injection nozzles as a whole. This injection quantity-controlling means is also designed to change the quantity of fuel to be injected from the injection nozzle on the basis of a signal to be emitted corresponding to a change in load on the engine, such as the revolution speed of the internal combustion engine.

Since a thinned-out injection can be performed at low revolution speed, such as at the occasion of the idling rotation of the engine where an output for heavy load is not required, it is possible not only to improve the stability in rotation of the engine, but also to soften the tone of the exhaust noise at a low revolution speed of engine, thus minimizing exhaust noise pollution.

When the aforementioned internal combustion engine is operated in a thinned-out injection mode where the injection of fuel is performed at every second revolution of the crank shaft, the injection of fuel into the combustion chamber is intermittently omitted in the scavenging stroke, thus intermittently feeding only air into the combustion chamber in the scavenging stroke. When only air is fed into the combustion chamber and then discharged from the combustion chamber, any residual unburnt gas such as HC that might be left remaining in the combustion chamber is discharged by this air, thus cleansing the interior of the combustion chamber. At the same time, even if any portion of the unburnt gas thus discharged together with air is left remaining in an exhaust pipe, such unburnt gas portion can be burnt with the air (oxygen) in a catalyst chamber, thereby effectively suppressing any discharge of unburnt gas from the internal combustion engine.

It is also possible to change the output of the engine by changing the thinned-out injection pattern.

Moreover, since the quantity of fuel to be injected in one injection of fuel can be easily altered so as to alter the output of the internal combustion engine, it is possible to provide an internal combustion engine which is capable of easily conforming with a fluctuation in load. At the same time, the air/fuel ratio of the engine, in a lean burn for instance, can be accurately and easily controlled.

DETAILED DESCRIPTION OF A PREFERRED EMBODIMENT OF THE INVENTION

The present invention will be further explained with reference to the drawings depicting one embodiment of the control device of a fuel injection type two-cycle internal combustion engine according to this invention.

Figure 1:
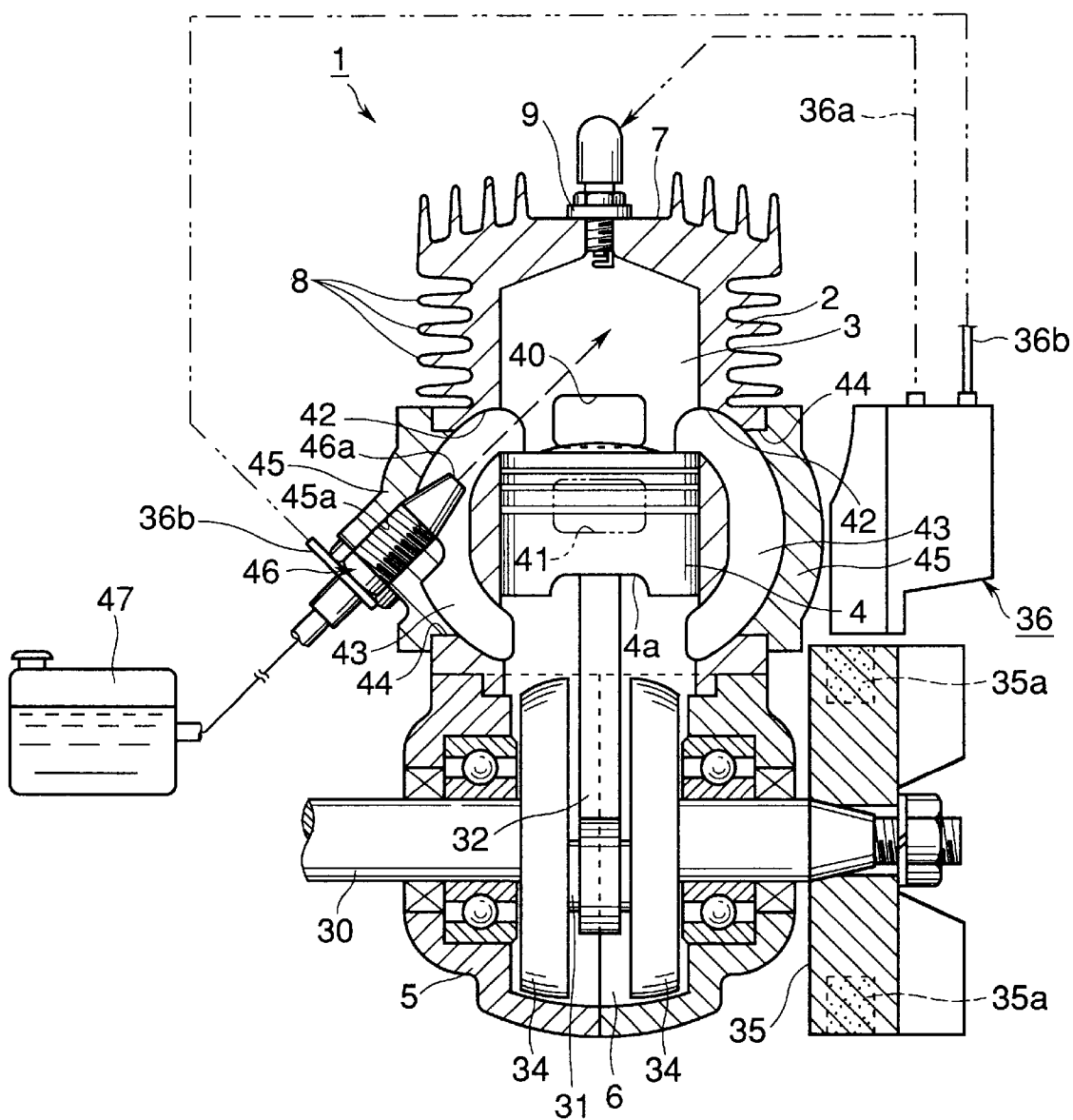
FIG. 1 is a longitudinal sectional view illustrating one embodiment of a two-cycle internal combustion engine provided with a control device according to this invention.

FIG. 1 is a longitudinal sectional view of a fuel injection type two-cycle internal combustion engine 1 (hereinafter referred to simply as an internal combustion engine) according to this embodiment. This internal combustion engine 1 is formed of a so-called Schnürle type crank chamber pre-compression two-cycle internal combustion engine, and comprises a cylinder block 2 having a combustion chamber 3 in which a piston 4 is adapted to be slidingly moved up and down, a split type crankcase 5 attached to the lower end portion of the cylinder block 2 and provided therein with a crank chamber 6, a cylinder head 7 which is formed integral with the upper portion of the cylinder block 2, a plurality of cooling fins 8 for air-cooling formed on the outer periphery of the cylinder block 2, and a spark plug 9 attached to a suitable portion of the cylinder head 7 and connected via a high voltage cable 36a to an ignition control device 37 to be explained hereinafter.

The crank chamber 6 is cylindrical in shape, short in height and hermetically closed. A crank shaft 30 is axially held at a central portion of each of the right and left sides of the crank chamber 6. The piston 4 is connected via a connecting rod 32 to a crank pin 31 of the crank shaft 30. A pair of sector-shaped crank webs 34 are fixed at the right and left ends of the crank pin 31 so that the connecting rod 32 is interposed between the pair of sector-shaped crank webs 34. Therefore, the crank webs 34 are designed to be rotated integrally with the crank shaft 30.

A fan rotor 35 for air-cooling is fixed to one end portion of the crank shaft 30. A plurality of magnets 35a are embedded in the outer peripheral wall of the fan rotor 35. A control device 36 (to be explained in detail hereinafter), in which the ignition control device 37 and a fuel control device 39 are integrally built, is disposed to face the outer peripheral wall of the fan rotor 35, thereby allowing the output power of the control device 36 to be supplied to the spark plug 9 and to a fuel injection nozzle 46 (to be explained in detail hereinafter).

The cylinder block 2 is provided with an exhaust port 40 which opens at a portion of the inner wall of the combustion chamber 3 that is directed to intersect at right angle with the axis of the crank shaft 30. The cylinder block 2 is also provided with a suction port 41 which opens at a portion of the inner wall of the combustion chamber 3 that approximately faces the exhaust port 40 (a portion which is dislocated by an angle of 180°), but which is located at somewhat lower level than where the exhaust port 40 is located. Furthermore, a pair of scavenging ports 42 are formed in the cylinder block 2 to face each other at portions of the inner wall of the cylinder block 2 located at an intermediate portion between the exhaust port 40 and the suction port 41, i.e. each set apart by an angle of 90° from the exhaust port 40 and the suction port 41 (right and left sides in FIG. 1). The scavenging ports 42 are formed on the top of respective so-called wall type scavenging passages 43, each of which extends from the scavenging ports 42 toward the lower portion of the cylinder block 2 so as to communicate with the crank chamber 6.

In order to facilitate the monoblock casting of the cylinder block 2 and cylinder head 7 by means of a high pressure die casting, a pair of openings-for-casting 44 are formed respectively along the scavenging passages 43 thus allowing the outer side of each scavenging passage 43, to be communicated with the outer atmosphere. Accordingly, a pair of scavenging passage covers 45, each having a smoothly curved inner surface in conformity with the scavenging passage 43 and prepared separately from the cylinder block 2, are attached to the openings-for-casting 44, respectively. When the scavenging passage covers 45 are fixed to the openings-for-casting 44, respectively, by use of an adhesive for instance, the openings-for-casting 44 are closed, thereby completing smoothly curved passages so as to allow scavenging air to pass therethrough, thus exhibiting an efficient scavenging.

One (the one on the left side in FIG. 1) of the scavenging passage covers 45 is provided with an internally threaded through-hole 45a, in which a fuel injection nozzle 46 having an external thread on its outer peripheral wall is inserted or screwed. The distal end 46a of the fuel injection nozzle 46 is directed toward the top of the combustion chamber 3. Upon injection of fuel, therefore, the fuel is injected to a region inside the combustion chamber 3 that is optimum for the combustion of the fuel.

Figure 2:
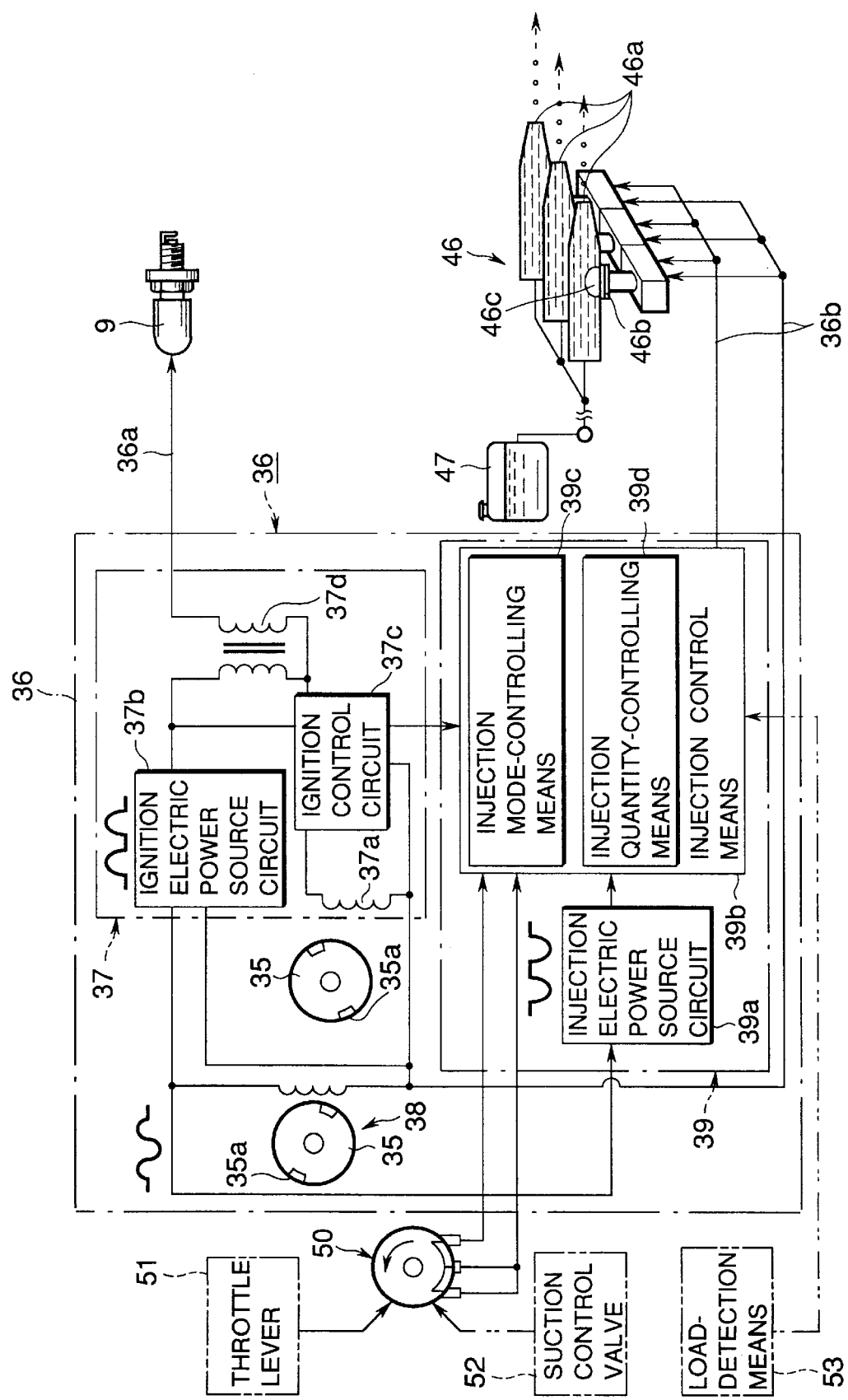
FIG. 2 is a block diagram illustrating the control device of the internal combustion engine shown in FIG. 1.

FIG. 2 is a block diagram illustrating a formation of the control device 36 of the internal combustion engine 1 according to this embodiment, and also illustrates the relationship between the control device 36 and the spark plug 9 or the fuel injection nozzle 46 that are to be actuated by the control device 36.

The fuel injection nozzle 46 is connected to a fuel tank 47. Because the fuel tank 47 is generally disposed lower than the fuel injection nozzle 46, the fuel from the fuel tank 47 is fed to the position of the fuel injection nozzle 46 by means of a priming pump (at the occasion of start-up) or a lift pump (during operation), both of which (not shown) are of the ordinary type conventionally employed in a two-cycle internal combustion engine (air-fuel mixture suction type).

The fuel injection nozzle 46 is provided therein with a heating element 46b formed by an electric heater, etc., which is connected to the fuel control circuit 39. The heating element 46b is adapted to be instantaneously heated by electrical power of high voltage supplied from the fuel control circuit 39. When the heating element 46b is heated in this manner, the fuel which has been fed to the nozzle 46 is instantaneously heated to undergo a phase change so as to generate bubbles 46c. Simultaneously with the growth of the bubbles 46c, the inner pressure of the nozzle 46 is increased, so that the fuel is forcibly injected from the opening of the distal end portion 46a of the nozzle 46 into the combustion chamber 3.

Since the cylinder block 2 is provided with a plurality of the injection nozzles 46 each having a heating element 46b, the quantity of fuel to be injected can be adjusted by individually and selectively controlling a plurality of heating elements 46b. It is also possible to set a porous body such as a ceramic porous body in the interior of the nozzle 46, so as to allow a fuel to be soaked into the porous body and then be heated by the heating element 46b.

The control device 36 of the internal combustion engine 1 comprises an AC generating means 38 and a fuel control device 39 which are integrally incorporated into the control device 36 in addition to an ignition control device 37 of an ordinary CDI or TCI system. The AC generating means 38 is adapted to generate electricity through the rotation of the fan rotor 35 and to feed the electrical power thus generated to the ignition control device 37 and the fuel control device 39 so as to actuate the spark plug 9 and the fuel injection nozzle 46.

The ignition control device 37 is of the conventional type and comprises a pick-up coil 37a for controlling the timing of ignition, an ignition electric power source circuit 37b for performing a half-wave rectification of the AC current supplied from the AC generating means 38, an ignition-controlling circuit 37c and an ignition coil 37d.

On the other hand, the fuel control circuit 39 is constituted by an injection electric power source circuit 39a for performing a half-wave rectification (opposite in phase to the ignition electric power source circuit 37b) of the AC current, and an injection control means (circuit) 39b for controlling both the timing and the quantity of fuel injection. Namely, the injection control means 39b is provided with an injection mode-controlling means 39c for controlling the timing of fuel injection and with an injection quantity-controlling means 39d for controlling the quantity of fuel to be injected. The ignition control device 37 is connected via the high voltage cable 36a to a spark plug 9, while the fuel control circuit 39 is connected via wirings 36b to the fuel injection nozzle 46.

Actuation of the ignition control device 37 is effected by taking advantage of an AC electromotive force which is generated at the AC generating means 38. The electromotive force which is actually utilized in this ignition control device 37 is either a positive half-wave voltage or a negative half-wave voltage so that the other half-wave voltage is not utilized for this purpose. In this embodiment, the half-wave voltage that is not utilized in the ignition control device 37 is utilized for actuating the fuel injection nozzle 46.

Specifically, the AC generating means 38 is designed to generate an AC electromotive force through the rotation of the fan rotor 35, and the ignition is effected by the voltage of the positive side (or the negative side) at the moment when the AC voltage changes phase, i.e., from the positive side (or the negative side) to the negative side (or the positive side). The fuel injection nozzle 46 is designed to utilize a voltage of the opposite side of the AC electromotive force, i.e. a voltage of the negative side (or the positive side) as explained below. Namely, the AC electromotive force is taken out of the ignition control device 37 and transmitted to the injection control device 39, which is then actuated to cause the heating element 46b of the fuel injection nozzle 46 to be instantaneously heated through an application of high voltage by taking advantage of the voltage which is opposite to that employed in the ignition control device 37, i.e. the voltage of negative (or the positive) side, thereby heating and injecting the fuel therefrom.

Specifically, the AC power generated at the AC generating means 38 is supplied to the injection control device 39 and then half-wave-rectified by the injection electric power source circuit 39a into a DC power, which is then supplied to the injection control means 39b. The injection control means 39b is designed to receive an output signal (timing signal) from the ignition control circuit 37c of the ignition control device 37. Based on this output signal, electric power is transmitted through the wiring 36b to the heating elements 46b so as to instantaneously heat the heating elements 46b by the application of a high voltage. A part of the fuel heated by the heating elements 46b is changed into bubble 46c to pressurize the fuel. Then, the fuel is injected from the distal end portion 46a of the fuel injection nozzle 46 in conformity with the scavenging timing (the rotation of the crank shaft 30) of the internal combustion engine 1.

The injection mode-controlling means 39c is designed to selectively control the timing of injection (injection mode) in such a manner that fuel is allowed to be injected from the injection nozzle 46 when the internal combustion engine 1 takes a state of scavenging stroke by the revolution of the crank shaft 30 in a successive mode of one fuel injection per every revolution of the crank shaft 30, a thinned-out mode of one fuel injection per every second revolution of crank shaft, a thinned-out mode of one fuel injection per every third revolution of crank shaft, or a thinned-out mode of one rest of fuel injection per every third revolution of crank shaft. The injection mode-controlling means 39c is designed to be actuated based on the information from the detecting means for detecting various variables accompanying the operation of the internal combustion engine 1. For example, an angle sensor 50 such as a potentiometer or a rotary switch may be attached as a detecting means to the throttle lever 51 of the internal combustion engine 1, so that the injection mode-controlling means 39c can be actuated to alter the injection mode based on the information from the signal of an angle detected by the angle sensor 50. Namely, the movement of the throttle lever 51 for manipulating the suction control valve 52 of the internal combustion engine 1 is detected by the angle sensor 50, and, based on a change of the operation position of the throttle lever 51, the injection mode will be suitably selected, i.e. a successive injection mode or a thinned-out injection mode.

The injection quantity-controlling means 39d is designed to independently and selectively heat each heating element 46b mounted on each of the plural injection nozzles 46 so as to adjust the quantity of fuel to be injected from the injection nozzles 46 as a whole. The injection quantity-controlling means 39d is also designed to change the quantity of fuel to be injected from the injection nozzles 46 as a whole on the basis of the output signal from a load-detecting means 53 for detecting changes in load of the engine 1, such as the revolution speed of the internal combustion engine 1, the seat temperature of the ignition plug 9, etc.

Next, the operation of the control device 36 of the internal combustion engine 1 according to this embodiment will be explained as follows.

The internal combustion engine 1 according to the foregoing embodiment is of a so-called piston valve system, wherein neither a suction valve nor an exhaust valve is provided, and the suction port 41 and the exhaust port 40 are alternatively allowed to communicate respectively with the crank chamber 6 and with the combustion chamber 3 by the reciprocating movement (up and down movement) of the piston 4, thereby performing the suction and exhaust functions of the engine 1 in the same manner as the aforementioned suction valve and exhaust valve.

In the operating condition of the internal combustion engine 1 where the piston 4 is moved up and down, when the piston 4 is moved down to come close to the bottom dead center, the exhaust port 40 is opened at first thereby allowing the combustion exhaust gas to be discharged from the interior of the combustion chamber 3 to the outside of the internal combustion engine 1. Then, the scavenging ports 42 are opened thereby allowing the air sucked and pre-compressed in the crank chamber 6 to flow via the scavenging passages 43 into the combustion chamber 3, thereby purging any residual combustion exhaust gas out of the combustion chamber 3 through the exhaust port 40 and thus scavenging the combustion chamber 3. In this occasion, a little amount of the sucked air is also discharged through the exhaust port 40.

During this scavenging operation, the piston 4 starts to move upward to again close the scavenging port 42. However, at a suitable timing immediately before the scavenging port 42 is closed, the heating element 46b of the fuel injection nozzle 46 is instantaneously heated in accordance with an output signal from the fuel injection control means 39b of the control device 36 of the internal combustion engine 1, thereby allowing the fuel to be injected directly into the combustion chamber 3 from the distal end 46a of the fuel injection nozzle 46 and mixed with the air sucked in the combustion chamber 3.

In the injection of fuel from the fuel injection nozzle 46, the fuel injection mode is suitably selected, based on the signals from the angle sensor 50, by the injection mode-controlling means 39c of the fuel injection control means 39b, i.e. the injection mode is selected from a successive injection mode, a thinned-out injection mode of every second revolution or every third revolution and so on.

Likewise, in the injection of fuel from the fuel injection nozzle 46, the heating element 46b of each of the plural injection nozzles 46 is independently and selectively heated by the injection quantity-controlling means 39d of the fuel injection control means 39b on the basis of the output signals from the load-detecting means 53 for detecting the revolution speed of the internal combustion engine 1, so as to adjust the quantity of fuel to be injected from the injection nozzles 46 as a whole.

It is possible with this double control by the injection mode-controlling means 39c and the injection quantity-controlling means 39d to suitably combine any of the fuel injection modes (a successive injection mode or a thinned-out injection mode) with the adjusted quantity of fuel to be injected, thereby making it possible to variously and extensively control the injection of fuel. After the fuel is injected, the piston 4 is further moved upward to first close the scavenging ports 42 and then to enter into the compression stroke while closing the exhaust port 40. When the piston 4 is further advanced to reach near the top dead center, a power of high voltage is supplied from the ignition control device 37 via the high voltage cable 36a to the spark plug 9, thereby to cause the spark plug 9 to spark and ignite the air-fuel mixture to be explosively burnt.

When the piston 4 is put into the compression stroke, the pressure in the crank chamber 6 is gradually decreased with the ascending movement of the piston 4, so that when the skirt portion 4a of the piston 4 is moved up to pass through the suction port 41, thus allowing the suction port 41 to be communicated with the crank chamber 6, the ambient air is sucked into the crank chamber 6 through an air cleaner (not shown).

In the expansion stoke following the ignition of the compressed air-fuel mixture, when the piston 4 is moved downward to close the suction port 41, the air that has been sucked in the crank chamber 6 is pre-compressed, and then the scavenging ports 42 are opened, thus allowing the crank chamber 6 to communicate with the combustion chamber 3. As a result, the air that has been sucked and pre-compressed in the crank chamber 6 is forced to enter via the scavenging passages 43 into the combustion chamber 3 from the scavenging ports 42, thus making it ready to repeat a sequence of the strokes as mentioned above.

In the scavenging stroke in the operation of the internal combustion engine 1 of the thinned-out injection mode in which fuel is not injected into the combustion chamber 3, only air is permitted to enter the combustion chamber 3. The air thus fed into the combustion chamber 3 is then compressed and discharged from the exhaust port 40. As a result, the exhaust gas containing any residual unburnt gas that might remain in the combustion chamber 3 is completely discharged by this air.

Since the control device 36 of the two-cycle internal combustion engine 1 according to this embodiment is provided with the injection mode-controlling means 39c as one means to control the injection of fuel from the fuel injection nozzle 46, the operation of the internal combustion engine 1 can be performed by suitably changing the injection mode, i.e. the injection mode can be suitably selected from one fuel injection per every revolution of the crank shaft 30 of the internal combustion engine 1 (a successive injection), a thinned-out injection to perform one fuel injection per every second revolution of the crank shaft 30, a thinned-out injection to perform one fuel injection per every third revolution of crank shaft 30, and so on.

Since a thinned-out injection can be performed at low revolution speed, such as at the occasion of the idling rotation of the engine 1 where an output for heavy load is not required, it is possible not only to improve the stability in rotation of the internal combustion engine 1, but also to soften the tone of the exhaustion noise at a low revolution speed of the engine 1, thus minimizing unpleasant noise pollution.

Since the internal combustion engine 1 can be operated with the aforementioned thinned-out injection, the advantages of four-cycle internal combustion engine can be achieved even in a two-cycle internal combustion engine. Namely, since fuel is fed into the combustion chamber 3 in every revolution of the crank shaft 30 in the conventional two-cycle internal combustion engine, it has been very difficult to avoid the aforementioned phenomenon of blow-by wherein unburnt air-fuel mixture such as HC is discharged from the engine. However, when the internal combustion engine is operated in a thinned-out injection mode, the injection of fuel into the combustion chamber is intermittently omitted in the scavenging stroke, thus intermittently feeding only air into the combustion chamber 3 in the scavenging stroke. When only air is fed into the combustion chamber 3 and then discharged from the combustion chamber 3, any residual unburnt air-fuel mixture, such as HC, that might remain in the combustion chamber 3 can be completely discharged by this air, thus cleansing the interior of the combustion chamber 3. At the same time, even if any portion of the unburnt air-fuel mixture thus discharged together with air may still remain in an exhaust pipe, this unburnt portion can be burnt with the discharged air (oxygen) in a catalyst chamber, thereby effectively suppressing any discharge of unburnt air-fuel mixture from the internal combustion engine 1.

Since the control device 36 of the internal combustion engine 1 according to this embodiment is provided with the injection quantity-controlling means 39d as a means for controlling the injection of fuel from the fuel injection nozzle 46, each heating element 46b of each of the plural injection nozzles 46 can be independently and selectively heated, thereby making it possible to easily change the quantity of fuel to be injected in each fuel injection. As a result, the output of the internal combustion engine can be changed, thus making it possible for the internal combustion engine to easily cope with any change in load. At the same time, the air/fuel ratio of the engine, in a lean burn for instance, can be accurately and easily controlled.

Thus, as explained above, since the control device of internal combustion engine according to this invention is provided not only with an injection mode-controlling means for controlling the timing of fuel injection but also with an injection quantity-controlling means for controlling the quantity of fuel to be injected, the control of the timing of fuel injection and the adjustment in the quantity of fuel injected can be easily performed even in a two-cycle internal combustion engine. At the same time, it is possible to minimize toxic components in the exhaust gas and to lower the engine noise.

In the foregoing explanation, the present invention has been explained with reference to a specific embodiment. It will be understood, however, that the invention should not be construed to be limited to such embodiment, but may be variously modified within the spirit and scope of the appended claims.

We claim:

1. A control device for a two-cycle internal combustion engine having at least one fuel injector and an engine throttle assembly, said control device comprising:
   an ignition control device;
   a fuel control device coupled to said ignition control device and said fuel injector, said fuel control device in turn comprising:
      an injection mode-controlling means for controlling a successive mode and intermittent modes of fuel injection based upon the operation of said engine throttle assembly; and
      an injection quantity-controlling means for controlling, independently from said injection mode-controlling means, the quantities of fuel injected during said successive and intermittent modes of fuel injection by varying the pressure of fuel injection based upon the load on said engine, wherein control of said modes of fuel injection are combined with control of said independently controlled quantities of fuel to extensively vary and control said fuel injection.

2. The control device according to claim 1, wherein:
   said successive mode of fuel injection is a one-injection per revolution mode wherein fuel is injected during every revolution of said engine; and
   said intermittent modes are fuel injection modes wherein fuel is injected during every n-th revolution of said engine.

3. The control device according to claim 1, wherein said engine includes a detecting means coupled to said injection mode-controlling means.

4. The control device according to claim 3, wherein said engine throttle includes a throttle lever coupled to said detecting means such that said detecting means is operative to detect a rotated angle of said throttle lever.

5. The control device according to claim 3, wherein said engine throttle assembly includes a suction control valve coupled to said detecting means such that said detecting means is operative to detect a rotated angle of said suction control valve.

6. The control device according to claim 1, wherein said injection quantity-controlling means is operative to control the quantity of fuel to be injected in accordance with a signal corresponding to the load on the internal combustion engine.

7. The control device according to claim 6, wherein said signal corresponding to the load on the engine corresponds to the revolution speed of the internal combustion engine.

8. The control device according to claim 1, wherein each fuel injector includes a fuel injection nozzle and a heating element disposed therein, and wherein said injection quantity-controlling means is operative to selectively control the heating of said heating element disposed within said fuel injection nozzle.

* * * * *